US008751596B2

(12) United States Patent
Waldron, III et al.

(10) Patent No.: US 8,751,596 B2
(45) Date of Patent: Jun. 10, 2014

(54) COMMUNICATION MONITORING AND MANAGEMENT SYSTEM

(75) Inventors: Willard H. Waldron, III, Charlotte, NC (US); Timothy James Mark, Berkeley, CA (US)

(73) Assignee: Bank of America Corporation, Charlotte, NC (US)

( * ) Notice: Subject to any disclaimer, the term of this patent is extended or adjusted under 35 U.S.C. 154(b) by 810 days.

(21) Appl. No.: 12/771,552

(22) Filed: Apr. 30, 2010

(65) Prior Publication Data

US 2011/0270869 A1  Nov. 3, 2011

(51) Int. Cl.
*G06F 15/16* (2006.01)
*G06F 15/173* (2006.01)

(52) U.S. Cl.
USPC .......................... 709/207; 709/203; 709/224

(58) Field of Classification Search
CPC ..... G06F 11/3409; H04L 43/08; H04L 43/16; H04L 41/06; H04L 1/188
See application file for complete search history.

(56) References Cited

U.S. PATENT DOCUMENTS

| 6,396,513 | B1 * | 5/2002 | Helfman et al. ............... 709/207 |
| 6,556,659 | B1 * | 4/2003 | Bowman-Amuah ......... 379/9.04 |
| 6,904,449 | B1 * | 6/2005 | Quinones ....................... 709/203 |
| 7,886,000 | B1 * | 2/2011 | Polis et al. ..................... 709/203 |
| 2004/0143636 | A1 * | 7/2004 | Horvitz et al. ................ 709/207 |
| 2006/0212567 | A1 * | 9/2006 | Gulledge et al. .............. 709/224 |

\* cited by examiner

*Primary Examiner* — Peling Shaw
(74) *Attorney, Agent, or Firm* — Michael A. Springs; Moore & Van Allen PLLC; James C. Edwards (57) ABSTRACT

Embodiments of the invention relate to systems, methods, and computer program products for managing electronic communications and, specifically, monitoring electronic communications received from numerous communications sources associated with a user, identifying that certain ones of the communications are priority communications and communicating notice of the priority communications to the user. The priority communication may be identified by user defined criteria, such key words, phrases, key topics, key names and the like; timeframe of the communication; user-defined priority rules; business performance indicators/metrics and the like. Communication of the notice may provide for communicating a priority communication alert to the user or communicating the notice to a network-accessible communication monitoring portal.

41 Claims, 5 Drawing Sheets

COMMUNICATION MONITORING AND MANAGEMENT SYSTEM

FIELD

In general, embodiments of the invention relate to methods, systems, apparatus and computer program products for communication monitoring and management and, more particularly, for monitoring a user's electronic communications received via a plurality of electronic communication sources and notifying the user if a critical or highly important communication is received.

BACKGROUND

In today's business environment, a business person has various ways to receive information electronically. These electronic communication sources include, but are not necessarily limited to, electronic mail (i.e., email), Short Message Service (SMS)/text messaging, instant messaging service, voicemail and the like. In addition, the recent advent of social networking and blogging services provide for additional electronic communication sources.

The numerous electronic communication sources provide the business person with a daunting task of trying to manage all of the communications received by the business person or otherwise relevant to the business person. The volume of electronic communication sources and particularly the volume of electronic communications emanating from these sources makes if extremely difficult for the business person to stay well informed and to address concerns in a timely fashion. In this regard, not only is the management of electronic communication a time consuming endeavor, it is also unreliable in that a business person can easily inadvertently miss or otherwise disregard an electronic communication that is critical and requires immediate attention.

Certain business persons, such as high level executives or the like, have addressed this problem by using personal assistants or other individuals to manage their business communications for them. In other words, business communications intended for the level business person are screened by the personal assistant or the like and only those deemed important are then forwarded to the attention of the high level business person. In certain instances, if the electronic communications are deemed to be highly critical the personal assistant may attempt to immediately contact the high level business person, either in person, via telephone communication or the like. While such a system can be somewhat effective, it does not guarantee that critical and/or highly important communication is forwarded to the high level business person. This is because the personal assistant is prone to same problems that plague the high level business person; important or otherwise critical communications can be overlooked. Moreover, the personal assistant may not process the knowledge to able to determine precisely which communications are important and/or critical, especially in the instance in which the issue surrounding the importance is a burgeoning issue not previously addressed by the high level business person.

In addition to problems related to communication oversights, such a personal assistant communication screening system tends to be inefficient and costly, in that, it adds another layer to the electronic communication process thereby potentially slowing down the communication and requires another individual's time to manage the communications. Such a system is obviously cost prohibitive in terms of managing communication for all business people regardless of stature or profile within the business.

An additional problem related to numerous communication sources and the volume of electronic communication associated with these sources is that, even in the instance in which a communication is received and read by the intended business person, the potential exists that the business person is unable to appreciate the significance or criticality of the communication because the business person is unaware of other current, real-time factors, such as current business performance, current industry performance or the like. In such instance, an otherwise innocuous communication may rise to the important or critical communication level, if the business person was aware of related business factors.

Therefore, a need exists to provide for a system for managing electronic communications from various sources and for notifying the electronic communication recipient when a critical or priority communication is received. The desired methods, apparatus and systems should provide for managing the electronic communications from all or most of the electronic communication sources associated with the business person, such as, but not limited to, email, text messaging instant messaging, voice mail, social networking and the like. In addition, the desired systems, methods, apparatus and the like should provide for the business person/user to dynamically define criteria for determining which communications are highly important/critical and, thus, give rise to the need to notify the business person/user of such communications. Additionally, the desired systems, methods, apparatus and computer program products should provide for taking into account current business performance and/or industry performance in determining which communications rise to the level of important and/or critical.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for management of electronic communication and specifically monitoring of electronic communication from various sources, identification of priority communication and user/communication recipient/notification of the priority communication. Embodiments herein described provide for monitoring electronic communication from a plurality of electronic communication sources, such as, but not limited to, email, SMS/text messaging, instant messaging, voicemail, social networking and the like.

The priority communication may be identified by user defined criteria, such key topics, key words, including key names, key phrases and the like, timeframe of the communication, previous responses and the like. Additionally, the user defined criteria may include user defined rules for elevating a communication to priority status and the criteria may be dynamically defined on-the-fly by the user based communication needs. In further embodiments of the invention identifying priority communications takes into account current business performance and or industry performance in determining if a communication is a priority communication.

Notification of the user of the priority communication may include communicating a priority communication alert to the user. The communication of the alert may be via a user designated communication source and/or the communication may be via a designated communication source/channel distinct from the electronic communication sources being monitored. In other embodiments of the invention notification of the user of the priority communication may include prioritizing the listing of the communications with the electronic communication source, such that priority communications appear before non-priority communications.

In further embodiments of the invention, notification of the user of the priority communication may include providing a communication management portal that is network-accessible to the user or a third party individual to provide the user or third party management of the electronic communications. The portal may provide for presenting alerts and/or prioritized listing of electronic communications. In addition, the portal may provide for business performance metrics/indicators and/or industry performance metrics/indicators.

A method for electronic communication management defines first embodiments of the invention. The method includes monitoring, at a computing device, a plurality of electronic communication sources for receipt of electronic communications associated with a user and determining, via a computing device processor, that one or more of the electronic communications are priority communications. The method further includes communicating, via a computing device, a notice of the one or more priority communications to the user.

In accordance with specific embodiments of the method, monitoring further includes monitoring the plurality of electronic communication sources including at least two or more of electronic mail, Short Messaging Service (SMS)/text messaging, instant messaging, voicemail, or social networking.

In further specific embodiments of the method, monitoring further including searching, via a computing device processor, the plurality of electronic communications for user-defined key words and/or key communication creators/senders and determining further comprises determining, via the computing device processor, that the one or more of the electronic communications are priority communications based on occurrence of one or more of the user-defined key words and/or receipt from the key communication creators/senders. In alternate embodiments, determining further includes determining, via the computing device processor, that the one or more of the electronic communication are priority communications based on meeting a predetermined threshold of occurrence of the user-defined key words.

In other alternate embodiments of the method, determining, further includes, determining, via a computing device processor, that one or more electronic communications are priority communications based on user-defined rules associated with the key words and/or key communication creators/senders. For example, in one specific embodiment, determining further includes determining, via the computing device, that two or more electronic communications received by separate electronic communication sources are priority communications based on occurrence of one or more of the user-defined key words in the two or more of the electronic communications.

In other specific embodiments of the method, determining further comprises determining, via the computing device, that one or more electronic communications are priority communications based on predetermined occurrence patterns of the user-defined key words in the electronic communications received by the plurality of electronic communication sources.

In still further specific embodiments the method includes monitoring at a computing device, the user's responses to the electronic communications determined to be priority communications. In such embodiments, communicating further comprises communicating, at the computing device, the notice of the one or more priority communications if the user has not responded to the priority electronic communications within a predetermined time period.

In yet further specific embodiments, the method includes monitoring, at a computing device, business performance metrics. In such embodiments, monitoring further includes searching, at the computing device, the plurality of electronic communications for user-defined key words and wherein determining further comprises determining, via the computing device processor, that the one or more of the electronic communications are priority communications based on the monitored business performance metrics and occurrence of one or more of the user-defined key words in the plurality of electronic communications.

In other specific embodiments of the method, communicating further includes communicating, via the computing device, the notice in the form of an electronic communication alert that notifies the user of the priority communications. In such embodiments, the electronic communication alert may be communicated via one or more user-designated electronic communication sources and/or via an electronic communication source distinct from the plurality of electronic communication sources.

In other specific embodiments of the method communicating further comprises communicating, via the computing device, the notice to a communication network-accessible portal, which can be accessed by the user or a third party user designate. In such embodiments the method may further include presenting, in the network-accessible portal, the received electronic communications from the plurality of electronic communication sources, such as in prioritized format based on the priority communications. In further such embodiments the method may further include presenting, in the network-accessible portal, business performance metrics.

An apparatus for electronic communication management provides for second embodiments of the invention. The apparatus includes a computing platform including a memory and at least one processor. The apparatus further includes an electronic communication monitoring application stored in the memory and executable by the processor. The application includes a communication monitoring routine configured to monitor a plurality of electronic communication sources for receipt of electronic communications associated with a user. The application further includes a priority communication determination routine configured to determine that one or more of the electronic communications are priority communications. Additionally, the application includes a priority communication notification routine configured to communicate notice of the one or more priority communications to the user.

In specific embodiments of the apparatus the communication monitoring routine is further configured to monitor the plurality of electronic communication sources including at least two or more of electronic mail, Short Message Service (SMS)/text message communication, instant message communication voicemail communication, or social networking communication.

In other specific embodiments of the apparatus, the communication monitoring routine is further configured to search the plurality of electronic communications for user-defined key words and/or key communication creators/senders and the priority communication determination routine is further configured to determine that the one or more of the electronic communications are priority communications based on occurrence of one or more of the user-defined key words and/or key communication creators/senders. In related embodiments, the priority communication determination routine is further configured to determine that the one or more of the electronic communication are priority communications based on meeting a predetermined threshold of occurrence of the user-defined key words.

In still further embodiments of the apparatus, the priority communication determination routine is further configured to determine that the one or more of the electronic communications are priority communications based on user defined rules. One such specific embodiment a specific rule provides for the communication monitoring routine to be configured to determine that two or more electronic communications received by separate electronic communication sources are priority communications based on occurrence of one or more of the user-defined key words in the two or more of the electronic communications.

In yet further specific embodiments of the apparatus, the priority communication determination routine is further configured to determine that one or more of the electronic communications are priority communications based on predetermined occurrence patterns of the user-defined key words in the electronic communications received by the plurality of electronic communication sources.

In other specific embodiments of the apparatus, the electronic communication monitoring application further includes a user response monitoring routine configured to monitor user's responses to the electronic communications determined to be priority communications. In such embodiments the priority communication notification routine may be further configured to communicate the notice of the one or more priority communications if the user has not responded to the priority electronic communication within a predetermined time period.

In still further embodiments the apparatus may include a business performance metric monitoring application stored in the memory, executable by the processor and configured to monitor one or more business performance metric monitoring routines configured to monitor one or more business performance metrics. In such embodiments of the apparatus, the communication monitoring routine may be further configured to search the plurality of electronic communications for user-defined key words and the priority communication determination routine may be further configured to determine that the one or more of the electronic communications are priority communications based on the monitored business performance metrics and occurrence of one or more of the user-defined key words in the plurality of electronic communications.

Other specific embodiments of the apparatus provide for the priority communication notification routine to be further configured to communicate the notice in a form of an electronic communication alert that notifies the user of the priority communications. In such embodiments, the electronic communication alert may be communicated via one or more user-designated electronic communication sources and/or via an electronic communication source distinct from the plurality of electronic communication sources.

In other embodiments, the apparatus includes a communications management portal application stored in the memory, executable by the processor, and configured to receive and present the notice of the one or more priority communications. In other related embodiments the communications management portal application may be further configured to present the received electronic communications from the plurality of electronic communication sources and, in such embodiments, the received electronic communication may be presented in prioritized listing format based on the priority communications. In addition, the communications management portal application may be further configured to present business performance metrics.

A computer program product defines third embodiments of the invention. The computer program product includes a computer-readable medium. The computer-readable medium includes a first set of codes for causing a computer to monitor a plurality of electronic communication sources for receipt of electronic communications associated with a user. The computer-readable medium further includes a second set of codes for causing a computer to determine that one or more of the electronic communications are priority communications. Additionally, the computer-readable medium includes a third set of codes for causing a computer to communicate a notice of the one or more priority communications to the user.

Thus, further details are provided below for systems, apparatus, methods and computer program products for managing electronic communications and, specifically, monitoring electronic communications received from numerous communications sources associated with a user, identifying that certain ones of the communications are priority communications and communicating notice of the priority communications to the user. The communication sources may include, but are not limited to, email, text messaging, instant messaging, voice mail, social networking services and the like. The priority communication may be identified by user defined criteria, such key topics, key words, including key names, key phrases and the like; timeframe of the communication; previous responses; user-defined priority rules; business performance indicators/metrics and the like.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, apparatus, systems, methods and computer program products are herein disclosed that provide for management of electronic communication and, specifically, monitoring of electronic communications from various sources associated with a user, identifying specific ones of the electronic communication as priority communication and notifying the user of the priority communication. Embodiments herein described provide for monitoring electronic communication from a plurality of electronic communication sources, such as, but not limited to, email, SMS/text messaging, instant messaging, voicemail, social networking services and the like.

The priority communication may be identified by user-defined criteria, such key words, key names, key phrases/topics and the like. Additionally, the user-defined criteria may include user defined rules for elevating a communication to priority status and the criteria may be dynamically defined on-the-fly by the user based on communication needs. In further embodiments of the invention identifying priority communications takes into account current business performance and or industry performance in determining if a communication is a priority communication. Notifying the user of the priority communication may include communicating a priority communication alert to the user and/or providing a communication management portal that is network-accessible to the user or a third party individual to provide the user or third party the capability to manage the electronic communications.

Figure 1:
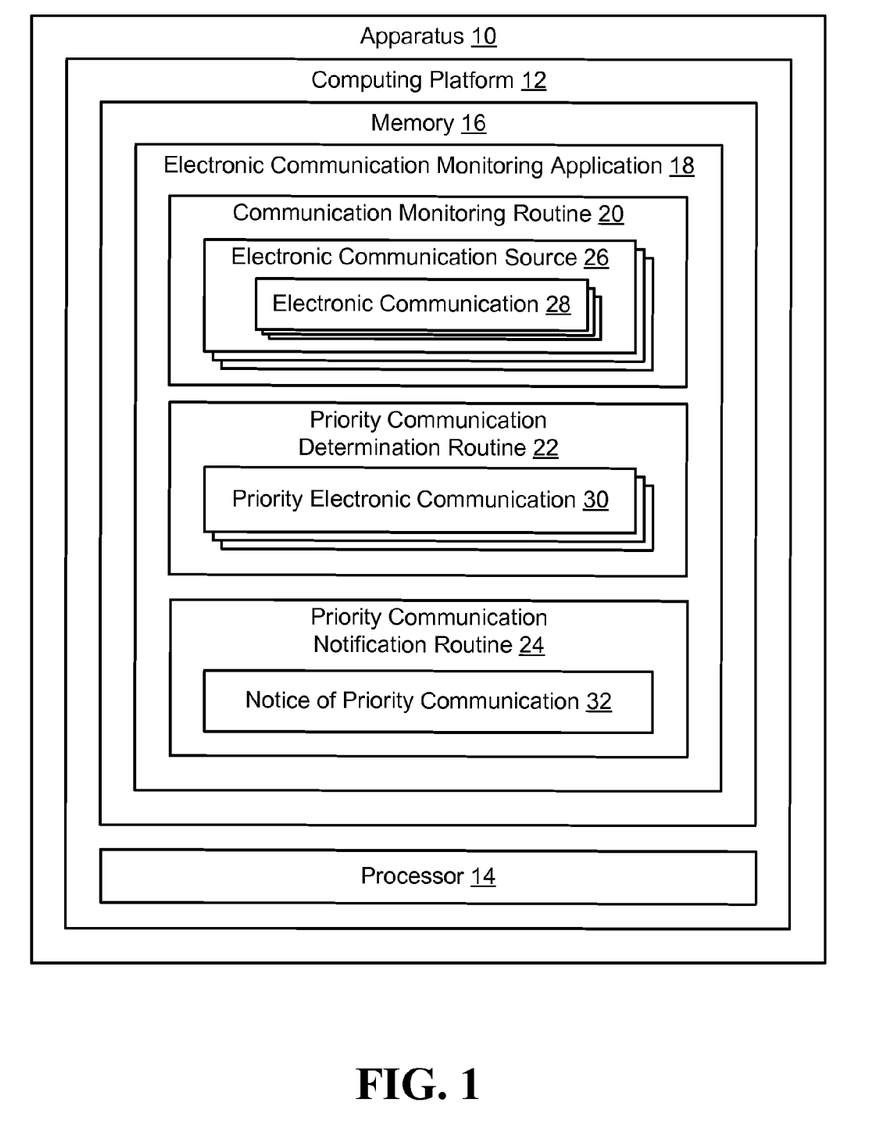
FIG. 1 is schematic diagram of an apparatus configured to provide electronic communication management, in accordance with embodiments of the present invention.

FIG. 1 provides a high level schematic diagram of an apparatus 10 configured for electronic communication monitoring and, more specifically, monitoring a user's electronic communications from a plurality of communication sources, determining priority communications from among the communications received by the plurality of communication sources and notifying the user of the priority communication. The apparatus 10 includes a computing platform 12 having at least one processor 14 and a memory 16.

The memory 16 of apparatus 10 stores electronic communication monitoring application 18, which is executable by processor 14 and includes communication monitoring routine 20, priority communication determination routine 22 and priority communication notification routine 24. It should be noted that electronic communication monitoring application 18 may executed on more than one computing device and, thus apparatus 10 may comprise more than one computing device. In addition, while communication monitoring routine 20, priority communication determination routine 22 and priority communication notification routine 30 are shown and described as being included with a single application, electronic communication monitoring application 18, the routines and functions of the routine may be included in separate ancillary applications.

The communication monitoring routine 20 is configured to monitor a plurality of communication sources 26 for receipt of electronic communication 28 associated with a user. In certain embodiments of the invention the routine 20 will monitor as many of the user's communication sources 26 as possible to insure that the user is notified of any communication 28 that is determined to be a priority communication. The plurality of communication sources 26 may include, but are not limited to, electronic mail (i.e., email), Short Message Service (SMS)/text, Multimedia Message Service (MMS), voicemail, social networking service or the like. In addition, the routine 20 can be configured to monitor multiple accounts within a communication source 26, such as multiple email accounts, multiple telephone numbers for voicemail, texts and the like. The routine 20 may be configured to receive all of the electronic communications 28 from the various sources 26, such as by re-routing the electronic communication to a monitoring location or the routine 20 may be configured to reach out to the various electronic communication sources 26 to monitor receipt of the electronic communications 28 at the user's respective inboxes or the like.

The priority communication determination routine 22 is configured to determine that one or more of the electronic communications being monitored are priority communications 30. In specific embodiments the invention, routine 22 includes a search engine (shown in FIG. 3) configured to search the electronic communications for user-defined key words, key phrases, key topics, key names, key time periods, any combination of the same or the like. The user can access application 18, such as via the Internet, an intranet or some other network connection, to define words, phrases, topics, names, time periods or the like as key. A user may define key words, phrases, topics, names or the like dynamically, on-the-fly as issues evolve that may give rise to priority communications. Additionally, routine 22 may be configured to recognize key communication creators/senders that give rise to the associated communication being a priority communication. For example, a user may designate all superior employees as key creators/senders and/or all immediate family members as key creators/senders. Moreover routine 22 may include pattern recognition logic that is configured to recognize patterns of key words, key phrases, key topics or the like, which upon recognition give rise to apriority communication.

Additionally, priority communication determination routine 22 may determine priority communications based on a predefined threshold of key words, key topics, key issues in the electronic communications. Alternatively, the routine 22 may be configured to provide for user-defined priority rules that establish the criteria for determining priority communications 30. The user-defined priority rules may be based on the key words, key phrases, key topics or the like, or they may be based on other criteria for defining priority communications 30.

In alternate embodiments of the invention, in addition to determining priority communications based on key words, key phrases, key topics or the like, business performance metrics and/or industry performance parameters may be used, solely or in conjunction with the key words, phrases, topics or the like, to determine that an electronic communication is a priority communication.

Priority communication notification routine 24 is configured to communicate a notice of the priority communication(s) 32 to the user and/or a third party designate of the user. In one embodiment of the invention, the notice 32 takes the form of an alert which may be communicated to the user and/or third party designate by a user-configured communication source, such as email text or the like. In alternate embodiments, the alert may be communicated to the user by a communication source separate and distinct from the plurality of communications being monitored. In certain embodiments in which the plurality of electronic communications 28 include voicemail, the routine may include voice-to-text routines to convert the voicemail to text for the purpose of communicating the contents of the electronic communication in an email, text message or the like.

In alternate embodiments of the invention, the notice 32 takes the form of a priority listing of electronic communications, such that the priority communications are listed first or otherwise prioritized prior to listing and/or display of the non-priority communications. The priority listing may be presented in the communication or the communication may provide network access, via hyperlink or the like, to the prioritized listing. The prioritized listing may exist in the user's inbox for the specific communication source associated with the priority communication(s), such as an inbox in an email application, voicemail application or the like, or the prioritized listing may be a comprehensive listing of all the electronic communications from the plurality of communication sources.

In still further embodiments of the invention, the priority communication notification routine 24 may be configured to communicate a notice 32 to an electronic communication portal (shown in FIG. 4) which provides network-accessibility to the priority communications 30. In such embodiments, the portal may be configured to provide the user with access to all of the electronic communications 28 received from the various communication sources 26. In this regard, the portal serves as a gateway that provides access to all of the electronic communications without the need to launch and access all of the applications associated with each of the communication sources. In such embodiments, notice 32 may take the form of a prioritized listing of the electronic communications 28 or the notice 32 may an alert that pops-up or is otherwise displayed within the portal.

Figure 2:
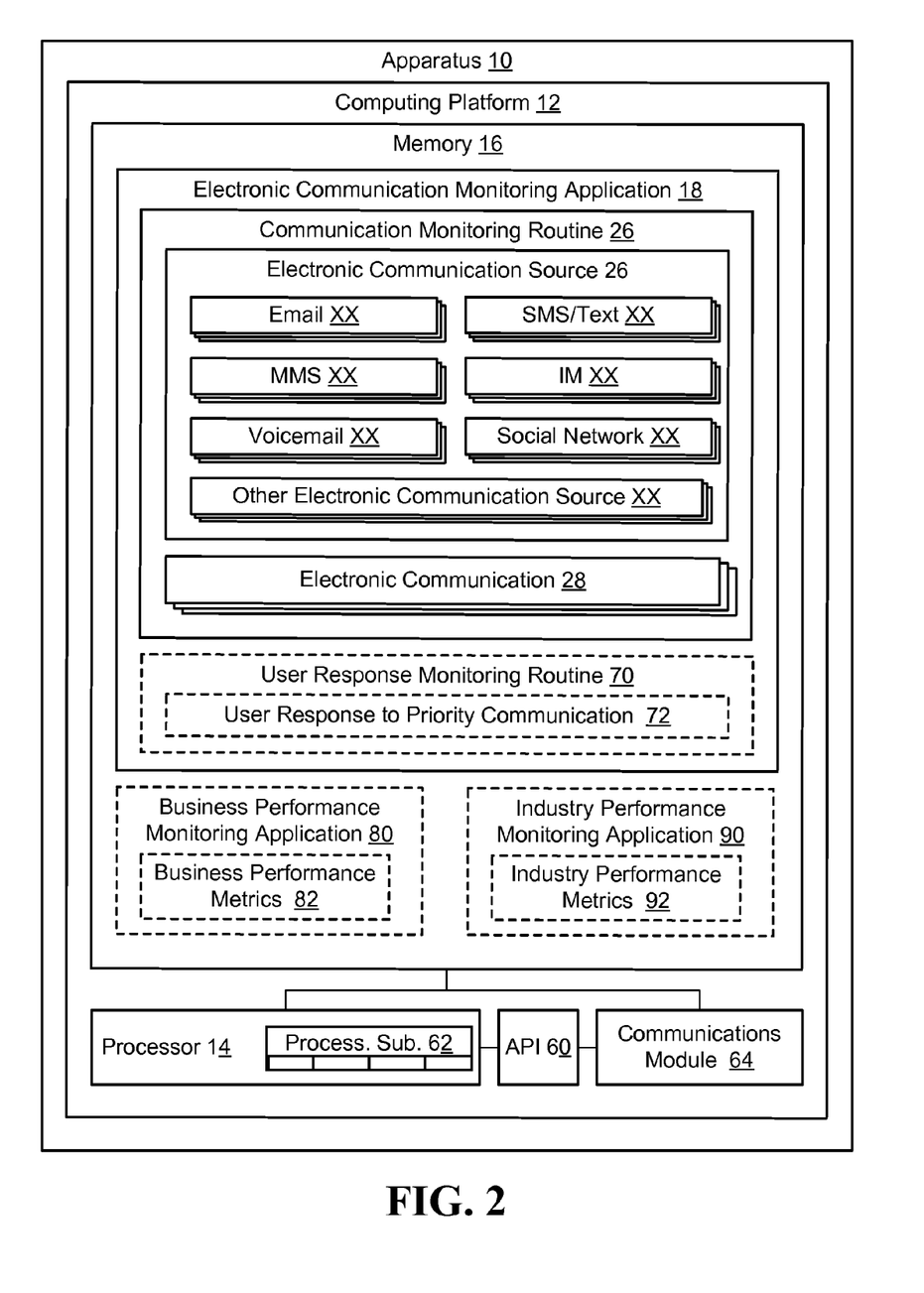
FIG. 2 is a schematic diagram of a more detailed apparatus configured to provide electronic communication management including a communications monitoring routine, in accordance with embodiments of the present invention.
Figure 3:
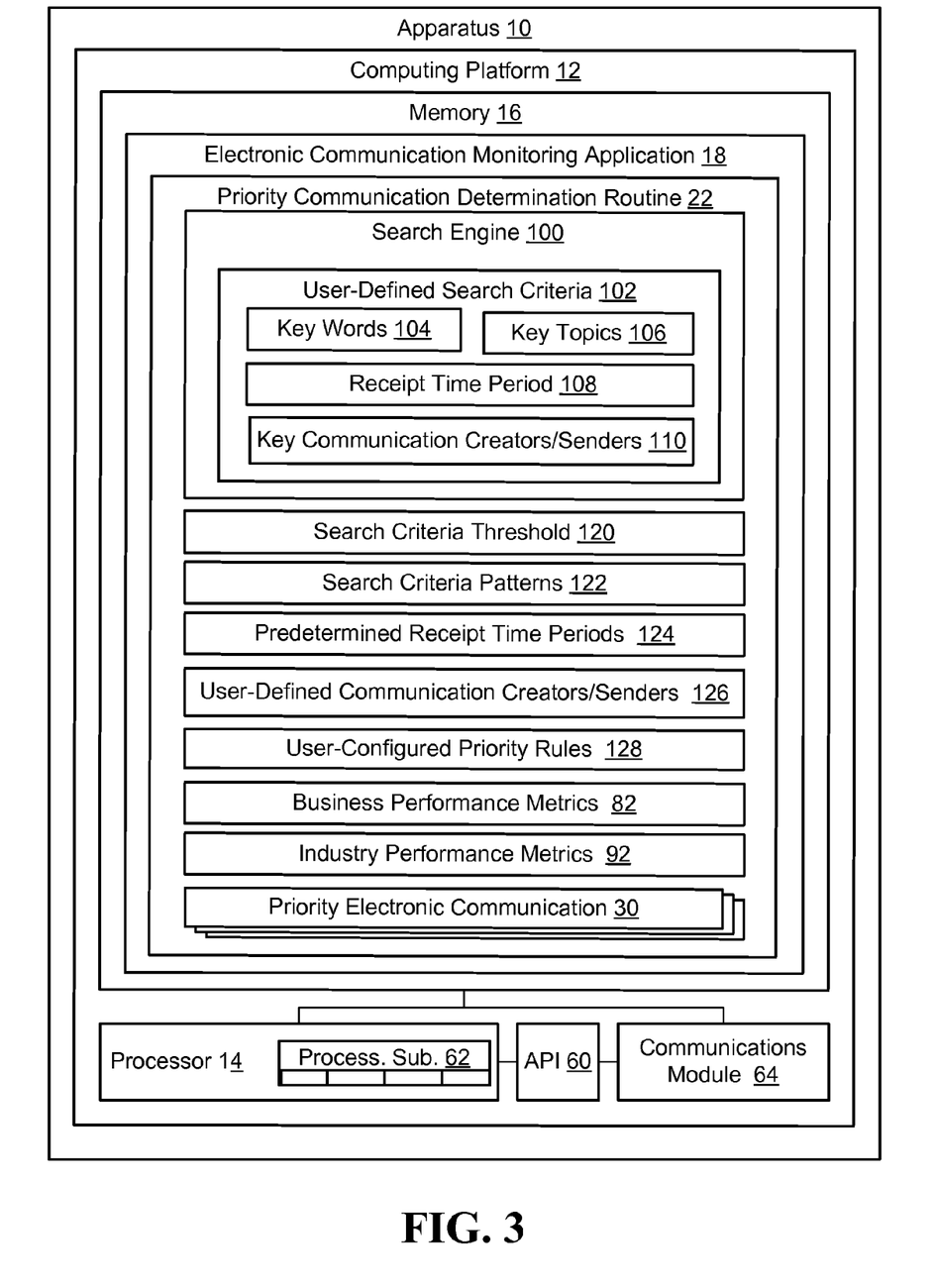
FIG. 3 is a schematic diagram of a more detailed apparatus configured to provide electronic communication management including priority communication determination routine, in accordance with embodiments if the present invention.
Figure 4:
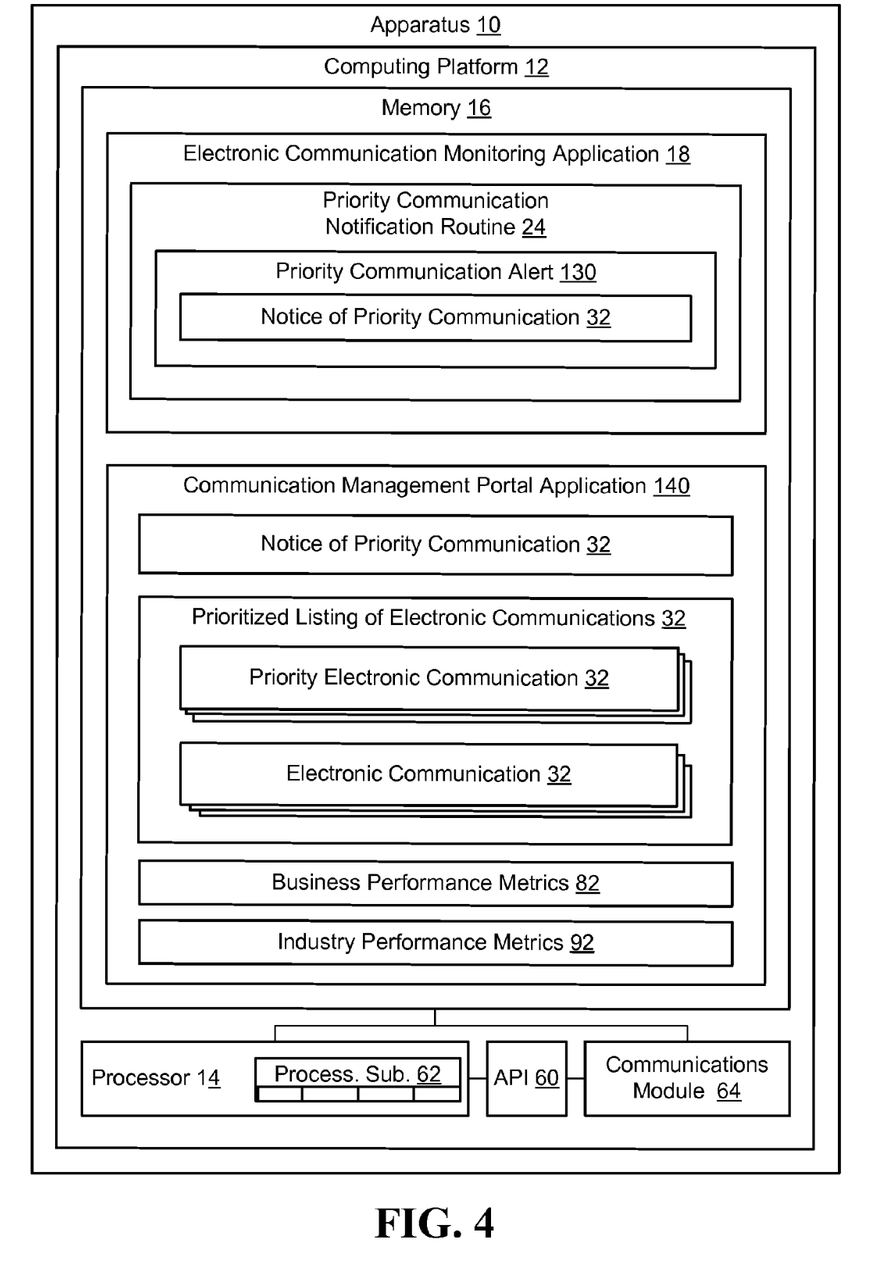
FIG. 4 is a schematic diagram of a more detailed apparatus configured to provide electronic communication management including priority communication notification routine and communication management portal routine, in accordance with embodiments if the present invention.

Referring to FIGS. 2-4 shown are more detailed block diagrams of apparatus 10, according to embodiments of the present invention. The apparatus 10 is configured to provide monitoring of electronic communication sources, determination of priority communications received at the sources and notification of the user associated with the priority communication. In addition to providing greater detail, FIGS. 2-4 highlight various alternate embodiments of the invention. The apparatus 10 may include one or more of any type of computerized device. The present apparatus and methods can accordingly be performed on any form of computing device.

The apparatus 10 includes computing platform 12 that can receive and execute routines and applications. Computing platform 12 includes memory 16, which may comprise volatile and non-volatile memory, such as read-only and/or random-access memory (RAM and ROM), EPROM, EEPROM, flash cards, or any memory common to computer platforms. Further, memory 16 may include one or more flash memory cells, or may be any secondary or tertiary storage device, such as magnetic media, optical media, tape, or soft or hard disk.

Further, computing platform 12 also includes processor 14, which may be an application-specific integrated circuit ("ASIC"), or other chipset, processor, logic circuit, or other data processing device. Processor 14 or other processor such as ASIC may execute an application programming interface ("API") 40 that interfaces with any resident programs, such as electronic communication monitoring application 18 or the like stored in the memory 16 of the apparatus 10.

Processor 14 includes various processing subsystems 42 embodied in hardware, firmware, software, and combinations thereof, that enable the functionality of apparatus 10 and the operability of the apparatus on a network. For example, processing subsystems 42 allow for initiating and maintaining communications and exchanging data with other networked devices. For the disclosed aspects, processing subsystems 42 of processor 14 may include any subsystem used in conjunction with electronic communication monitoring routine 18 or sub-routines, sub-modules thereof.

Computer platform 12 additionally includes communications module 44 embodied in hardware, firmware, software, and combinations thereof, that enables communications among the various components of the apparatus 10, as well as between the other networked devices. Thus, communication module 44 may include the requisite hardware, firmware, software and/or combinations thereof for establishing a network communication connection and communicating a notice of priority electronic communication to the user.

Referring to FIG. 2, as previously noted, electronic communication monitoring application 18 includes communication monitoring routine 20 configured to monitor a plurality of communication sources 26 for receipt of electronic communication 28 associated with a user. In certain embodiments of the invention the routine 20 will monitor as many of the user's communication sources 26 as possible to insure that the user is notified of any communication 28 that is determined to be a priority communication. The plurality of communication sources 26 may include, but are not limited to, electronic mail (i.e., email) 66, Short Message Service (SMS)/text 68, Multimedia Message Service (MMS) 70, instant message 72, voicemail 74, social networking service 76 and any other electronic communication sources 78 presently known or known in the future. In addition, the routine 20 can be configured to monitor multiple accounts within a communication source 26, such as multiple email accounts, multiple telephone numbers for voicemail, texts and the like.

In addition, according to alternate embodiments of the invention, electronic communication monitoring application 18 may include user response monitoring routine 70 that is configured to monitor user acknowledgement and/or responses 72 to electronic communications and, specifically acknowledgement and/or responses to electronic communications that have been determined to be priority communications. In such embodiments, the electronic communications monitoring application 18 may be configured to only invoke the priority communication notification routine 24 (i.e., communicate notifications of priority communications) if a determination is made that the user has not acknowledged and/or responded to the priority communication within a predetermined period of time. The predetermined period of time may be a user-configurable period of time. In this regard, the user response monitoring routine provides for a brief period of time between when a user receives an electronic communication and when a notification is communicated that the received communication is a priority communication which may be of highest interest to the user.

Additionally, according to further alternate embodiments of the invention, the memory 16 of apparatus 10 may include business performance monitoring application 80 and/or industry performance monitoring application 90. The business performance monitoring application 80 and industry performance monitoring applications are shown in FIG. 2 as being external from the electronic communication monitoring application 18; although in alternate embodiments they may be included within electronic communication monitoring application 18.

Business performance monitoring application 80 is configured to monitor business performance metrics 82, i.e., measurable indices that have an affect on the business that employs the user. In specific embodiments, the business performance metrics may be user-configurable metrics that have a direct affect on the user as it pertains to the business. In those embodiments in which business performance metrics 82 are monitored, the business performance metrics may be used in conjunction with occurrences of key word, key phrase, key topic in the electronic communications to determine priority communications. For example, different key words may be used or the threshold for key word inclusion may be varied based on current business performance metrics.

In a similar fashion, industry performance monitoring application 90 is configured to monitor industry performance metrics 92, i.e., measurable indices that have an affect on the industry associated with user's business. In specific embodiments, the industry performance metrics may be user-configurable metrics that have a direct affect on the user as it pertains to the industry. In those embodiments in which industry performance metrics 92 are monitored, the business performance metrics may be used in conjunction with occurrences of key word, key phrase, key topic in the electronic communications to determine priority communications. For example, different key words may be used or the threshold for key word inclusion may be varied based on current business performance metrics. In addition, in other specific alternate embodiments both the business performance metrics 82 and the industry performance metrics 92 may be used in conjunction with occurrences of key words, key phrases, key topics or the like to determine priority communications.

Referring to FIG. 3, as previously noted, electronic communication monitoring application 18 includes priority communication determination routine 22 configured to determine that one or more of the electronic communications are priority communications. According to specific embodiments of the invention, the routine 22 includes search engine 100 configured to search monitored electronic communication for user designated search criteria 102. The search criteria may include, but is not necessarily limited to, key words 104, including key terms, phrases, key names, key dates or the like; key topics 106; time period for receipt 108 of the electronic communication; and key communication creator/sender 110 and the like.

In specific embodiments of the invention, the determination of priority communication 30 may involve determining if search criteria 102, the key words 104, key topics 106 or the like meet or exceed a predetermined search criteria threshold 120. For example, in one embodiment of the invention, the search criteria threshold may be one, such that, any one single occurrence of a user-designated key word or the like provides for determination of a priority communication 30. In other embodiments of the invention individual thresholds may exist based on the communication source and/or the specific key word 104 key topic or the like. For example, the threshold for search criteria in emails may be higher than the threshold for text messages, since text messages tend to be shorter in length. In addition, in other embodiments, certain key words 104 of high significance may provide for a threshold of one or more occurrences of the key word 104, while other less significant key words 104 may have higher occurrence thresholds.

In other specific embodiments of the invention, determination of priority communication 30 may involve determining if certain predefined or dynamically defined criteria patterns 122 are evident in the electronic communications 28. Thus, priority communication determination routine 28 may rely on pattern recognition logic or the like to determine patterns based on search criteria, such key names 104, key topics 106 or the like. If similar patterns are evident in two or more electronic communications, one or both of the electronic communications may be determined to be priority communications.

Additionally, as previously noted, in certain specific embodiment of the invention, determination of priority communication 30 may include determining receipt time period 108 and determining if the receipt time period falls within a predetermined, user-defined, time period 124. For example, the time period in which a communication is received may dictate the search criteria threshold assigned to the communication. For example, electronic communication 28 received during regular business hours may have a higher or lower threshold that electronic communication received in the evening or at night. In addition, receipt time period 108 in combination with the communication creator/sender 126 may define criteria for priority communication. For example, communication from an immediate family member received during business hours may be designated as priority while communication from the same immediate family members received during the evening or weekend hours may not be designated as priority communications.

In addition, as previously discussed, in certain embodiments of the invention, user-configured priority rules 128 may determine electronic communications 28 that are designated as priority communications 30. The user-configured priority rules 128 may rely of search criteria 102, including key words 104, key topics 106, receipt time period 108, communication creators/senders 110 or the user-configured priority rules 128 may be based on other priority determination criteria as defined by the user. The priority rules 128 may be specific as to communication source and the like.

As noted in the discussion surrounding FIG. 2, in accordance with still further embodiments of the invention, business performance metrics 82 and/or industry performance metrics 92 may be monitored, in real-time or near-real-time, and applied, along with or in lieu of, search criteria 102 to determine priority communication 32.

Turning the reader's attention to FIG. 4, as previously noted, electronic communication monitoring application 18 includes priority communication notification routine 24 configured to communicate a notice of priority communication 32 to the user and/or a third party designate. In specific embodiments of the invention, the notice of priority takes the form of an alert 130 which is sent to the user and/or a third party user designate. The alert 130 may be communicated to be sent via a user configured communication channel, such as email, text, IM, or the like or the alert may be sent by a dedicated communication source separate form the monitored sources. In addition, the alert may include the content of the priority communication or access to the priority communication, such as through a hyperlink or the like. In the instances in which the alert 130 provides access to the priority communications, the recently received electronic communications may be presented in prioritized format, such as a prioritized listing, in which the priority communications are listed or otherwise emphasized first.

In alternate embodiments of the invention, the electronic communication monitoring application 18 may include communication management portal application 140 configured to provide a network-accessible communication monitoring portal that may be configured to provide for presentation of the notice of priority communication 32. As such, in addition to receiving an alert 32 or in lieu of receiving an alert 32, the user or third party designate may access the portal to gain access to electronic communications 28 and, specifically, priority communications 30. In specific embodiments of the invention, portal application 140 provides for a prioritized listing of electronic communications 142 received from the various electronic communication sources. The prioritized listing of electronic communications 142 provides for presenting the priority electronic communication(s) 30 first and the other non-priority electronic communications 28 second. As such, all communications from the various communication sources being monitored may be presented in the portal application 140. In addition, portal application 140 may provide for presentation of the business performance metrics 82 and/or industry performance metrics 92 along with the electronic communications 28 and priority communications 30, as a means of giving the user or third party designate more information to assess the importance of the communications. The business performance metrics 82 and/or industry performance metrics 92 may be presented as indicators that indicate the current state of a specific business or industry performance metric.

Figure 5:
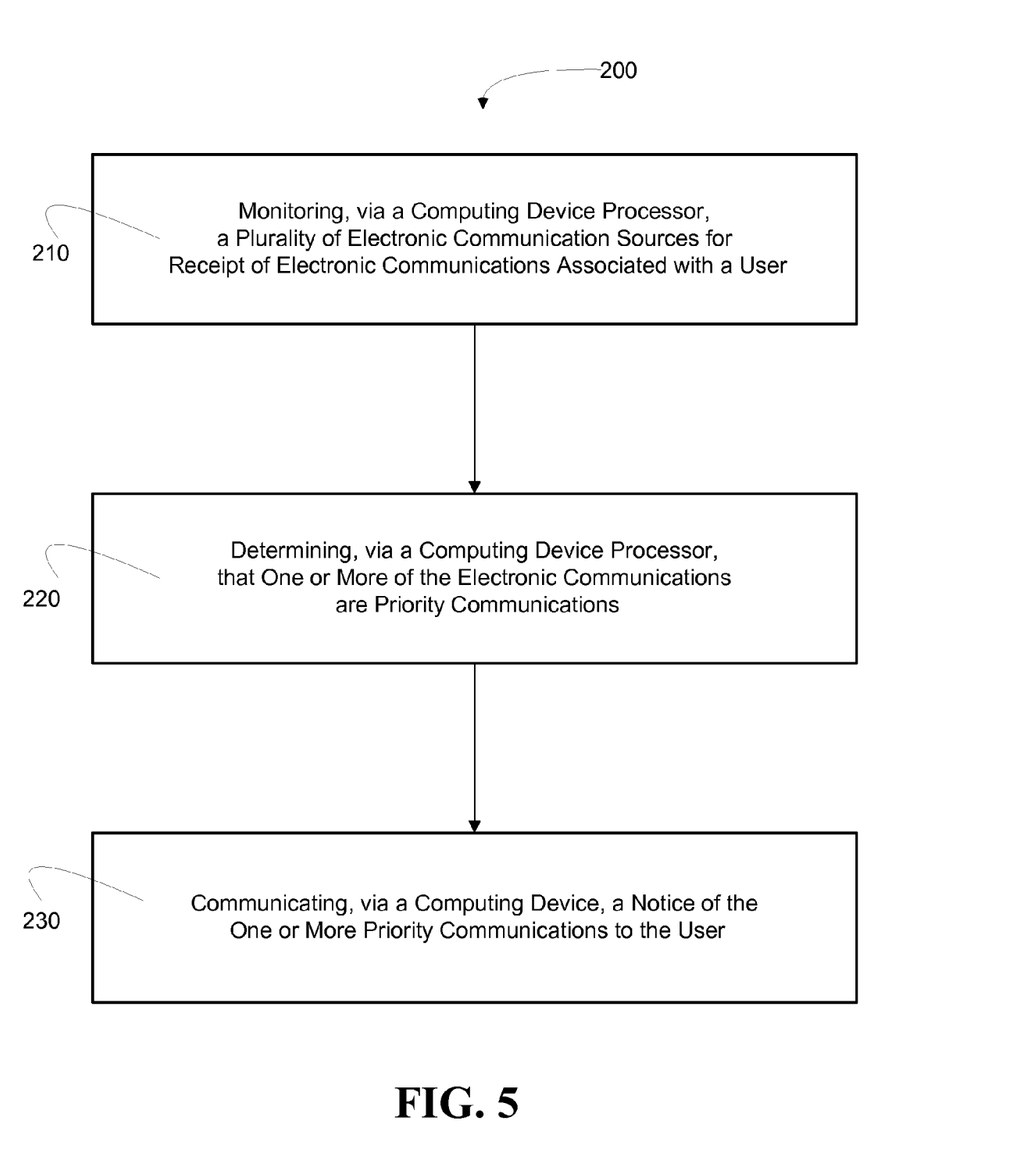
FIG. 5 is a flow diagram of a method for electronic communication management, in accordance with embodiments of the present invention.

Referring to FIG. 5 a flow diagram is depicted of a method 200 for managing electronic communications, in accordance with embodiments of the present invention. At Event 210, a plurality of electronic communication sources are monitored for receipt of electronic communications associated with a user. In certain embodiments, the method provides for monitoring most, it not all of the electronic communication sources that are associated with the user. The electronic communication sources may include, but are not limited to, email, SMS/text, MMS, IM, voicemail, social networking services and any other known or future known communication source.

At Event 220, one or more of the monitored electronic communications are determined to be priority communications. Priority communications may be determined by searching the electronic communications for search criteria, such as key words, including phrases, names, dates and the like, key topics, receipt time periods, communication creator/sender or the like. In such embodiments, determination of a priority communications may be based on occurrence of one or more key words or key topics or meeting or exceeding a predetermined threshold of key words/key topics. In other embodiments, determination of a priority communication may be based on the receipt time of the communication or the creator/sender of the communication, such criteria may be the sole basis for determination of priority communication or it may be used in combination with occurrences of key words/key topics.

In other specific embodiments of the method, determination of priority communications may be based on specific user-defined priority rules. The priority rules may base the determination on the key words/key topics, the time period of receipt, the creator/sender or any other search criteria deemed relevant be the user.

In other specific embodiments of the method, determination of priority communications may rely on pattern recognition logic to determine similar patterns in communications related to key words/key topics and the like.

At Event 230, a notice of priority communication is communicated to the user and/or a third party designate. In certain embodiments of the method, the notice takes the form of an alert communicated to the user and/or a third party designate. The alert may include the contents of the priority communication or include a hyperlink to allow for network access to the contents of the priority communication. The notice/alert may be communicated to the user or third party designate by a user chosen communication source, such as email, text or the like. It is also possible to configure communication, such that the notice/alert is sent via numerous communication sources to insure that the notice reaches the user at the earliest possible moment in time. In addition to or in lieu of communicating alerts, notification of the priority communication may take the form of presenting the notice/alerts in a network-accessible communication management portal. The portal may be configured to present the notices/alerts. In addition, the portal may be configured to present a prioritized listing of all the monitored/received communications for the various communication sources. The prioritized listing provides for presenting the prioritized communications first followed by the non-prioritized communications. In addition, to the notice/alerts and/or the prioritized listing of communications, the portal may be configured to present business and/or industry performance metrics for the purpose of providing the user a means to correlate the performance metrics with communication content to assess their importance (i.e., the need to identify the communications as priority communications).

Thus, present embodiments herein disclosed provide for improvements in electronic communication monitoring and management. Embodiments herein disclosed provide for an monitoring the receipt of electronic communications from numerous electronic communication sources, such as email, text, voicemail and the like, determine which of the monitored electronic communications are priority communications and communicating a notice of priority communications to the user and/or third party designate.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for electronic communication management, the method comprising:
monitoring, by a computing device, a plurality of electronic communication sources for receipt of electronic communications associated with a user, wherein the electronic communication sources include at least two of electronic mail (e-mail), Short Message Service (SMS)/text message communication, voicemail communication, or social networking communication;
monitoring, by a computing device, in real-time, one or more business performance metrics associated with a business that employs the user and one or more industry performance metrics associated with an industry that includes the business;
determining, by a computing device processor, that one or more of the electronic communications are priority communications by searching the plurality of electronic communications for user-defined key words and determining that the one or more electronic communications are priority communications based on (1) at least one of currently monitored business performance metrics and currently monitored industry performance metrics and (2) occurrence of one or more of the user-defined key words in the plurality of electronic communications;
monitoring, by a computing device, for an occurrence of the user acknowledging or responding to the priority communications within a predetermined period of time; and
in response to determining that the user has not acknowledged or responded to a priority communication within the predetermined period of time, communicating, by a computing device, an electronic notice of the one or more priority communications to the user.

2. The method of claim 1, wherein determining further comprises searching, by the computing device, the plurality of electronic communications for user-defined key words and wherein determining further comprises determining, via the computing device processor, that the one or more of the electronic communications are priority communications based on occurrence of one or more of the user-defined key words.

3. The method of claim 2, wherein determining further comprises determining, by the computing device processor, that the one or more of the electronic communication are priority communications based on meeting a predetermined threshold of occurrence of the user-defined key words.

4. The method of claim 1, wherein determining further comprises determining, by the computing device processor, that the one or more electronic communications are priority communications based on user-defined priority rules.

5. The method of claim 1, wherein determining further comprises searching, by the computing device, the plurality of electronic communications for creation by user-defined key communication creators determining that the one or more of the electronic communications are priority communications based on the one or more electronic communications being created by the user-defined communication creators.

6. The method of claim 2, wherein determining further comprises determining, by the computing device, that two or more electronic communications received by separate electronic communication sources are priority communications based on occurrence of one or more of the user-defined key words in the two or more of the electronic communications.

7. The method of claim 2, wherein determining further comprises determining, by the computing device, that the one or more electronic communications are priority communications based on predetermined occurrence patterns of the user-defined key words in the electronic communications received by the plurality of electronic communication sources.

8. The method of claim 1, wherein communicating further comprises communicating, by the computing device, the electronic notice in a form of an electronic communication alert that notifies the user of the priority communications.

9. The method of claim 8, wherein communicating further comprises communicating, by one or more user-designated electronic communication sources, the electronic communication alert.

10. The method of claim 8, wherein communicating further comprises communicating, by an electronic communication source distinct from the plurality of electronic communication sources, the electronic communication alert.

11. The method of claim 1, wherein communicating further comprises communicating, by the computing device, the notice to a communication network-accessible portal.

12. The method of claim 11, further comprising presenting, in the network-accessible portal, the received electronic communications from the plurality of electronic communication sources.

13. The method of claim 12, wherein presenting further comprises, presenting, in the network-accessible portal, the received electronic communication in prioritized format based on the priority communications.

14. The method of claim 12, further comprising presenting, in the network-accessible portal, business performance metrics associated with a business that employs the use.

15. An apparatus for electronic communication management, the apparatus comprising:
   a computing platform including a memory and at least one processor; and
   an electronic communication monitoring application stored in the memory, executable by the processor and including,
      a communication monitoring routine configured to monitor a plurality of electronic communication sources for receipt of electronic communications associated with a user, wherein the electronic communication sources include at least two of electronic mail (e-mail), Short Message Service (SMS)/text message communication, voicemail communication, or social networking communication,
      a business and industry performance metric monitoring application stored in the memory, executable by the processor and configured to monitor, in real-time, one or more business performance metrics associated with a business that employs the user and one or more industry performance metrics associated with an industry that includes the business,
      a priority communication determination routine configured to determine that one or more of the electronic communications are priority communications by searching the plurality of electronic communications for user-defined key words and determining that the one or more electronic communications are priority communications based on (1) at least one of currently monitored business performance metrics and currently monitored industry performance metrics and (2) occurrence of one or more of the user-defined key words in the plurality of electronic communications,
      a user response monitoring routine configured to monitor for an occurrence of the user acknowledging or responding to the priority communications within a predetermined period of time, and
      a priority communication notification routine configured to, in response to determining that the user has not acknowledged or responded to a priority communication within the predetermined period of time, communicate notice of the one or more priority communications to the user.

16. The apparatus of claim 15, wherein the priority communication determination routine further comprises a search engine configured to search the plurality of electronic communications for user-defined key words and determine that the one or more of the electronic communications are priority communications based on occurrence of one or more of the user-defined key words.

17. The apparatus of claim 16, wherein the priority communication determination routine is further configured to determine that the one or more of the electronic communications are priority communications based on meeting a predetermined threshold of occurrence of the user-defined key words.

18. The apparatus of claim 15, wherein the priority communication determination routine is further configured to determine that one or more of the electronic communications are priority communications based on user-defined priority rules.

19. The apparatus of claim 15, wherein the priority communication determination routine further comprises a search engine configured to search the plurality of electronic communications for creation by user-defined key communication creators and determine that the one or more of the electronic communications are priority communications based on the one or more electronic communications being created by the user-defined communication creators.

20. The apparatus of claim 16, wherein the priority communication determination routine is further configured to determine that two or more electronic communications received by separate electronic communication sources are priority communications based on occurrence of one or more of the user-defined key words in the two or more of the electronic communications.

21. The apparatus of claim 16, wherein the priority communication determination routine is further configured to determine that two or more electronic communications are priority communications based on predetermined occurrence patterns of the user-defined key words in the electronic communications received by the plurality of electronic communication sources.

22. The apparatus of claim 15, wherein the priority communication notification routine is further configured to communicate the electronic notice in a form of an electronic communication alert that notifies the user of the priority communications.

23. The apparatus of claim 22, wherein the priority communication notification is further configured to communicate the electronic communication alert via one or more user-designated electronic communication sources.

24. The apparatus of claim 15, wherein the priority communication notification is further configured to communicate the electronic communication alert via an electronic communication source distinct from the plurality of electronic communication sources.

25. The apparatus of claim 15, further comprising a communications management portal application stored in the memory, executable by the processor, and configured to receive and present the notice of the one or more priority communications.

26. The apparatus of claim 25 wherein the communications management portal application is further configured to present the received electronic communications from the plurality of electronic communication sources.

27. The apparatus of claim 20, wherein the communications management portal application is further configured to present the received electronic communication in prioritized format based on the priority communications.

28. The apparatus of claim 25, wherein the communications management portal application is further configured to present business performance metrics associated with a business that employs the user.

29. A computer program product comprising:
   a non-transitory computer-readable medium comprising:
      a first set of codes for causing a computer to monitor a plurality of electronic communication sources for receipt of electronic communications associated with a user, wherein the electronic communication sources include at least two of electronic mail (e-mail), Short Message Service (SMS)/text message communication, voicemail communication, or social networking communication;

a second set of codes for causing a computer to monitor, in real-time, one or more business performance metrics associated with a business that employs the user and one or more industry performance metrics associated with an industry that includes the business;

a third set of codes for causing a computer to determine that one or more of the electronic communications are priority communications by searching the plurality of electronic communications for user-defined key words and determining that the one or more electronic communications are priority communications based on (1) at least one of currently monitored business performance metrics and currently monitored industry performance metrics and (2) occurrence of one or more of the user-defined key words in the plurality of electronic communications;

a fourth set of codes for causing a computer to monitor for an occurrence of the user acknowledging or responding to the priority communications within a predetermined period of time; and a fifth set of codes for causing a computer to, in response to determining that the user has not acknowledged or responded to a priority communication within the predetermined period of time, communicate an electronic notice of the one or more priority communications to the user.

30. The computer program product of claim 29, wherein the third set of codes is further configured to cause the computer to search the plurality of electronic communications for user-defined key words and determine that the one or more of the electronic communications are priority communications based on occurrence of one or more of the user-defined key words.

31. The computer program product of claim 30, wherein the third set of codes is further configured to cause the computer to determine that the one or more of the electronic communication are priority communications based on meeting a predetermined threshold of occurrence of the user-defined key words.

32. The computer program product of claim 29, wherein the third set of codes is further configured to cause the computer to search the plurality of electronic communications for creation by user-defined key communication creators and determine that the one or more of the electronic communications are priority communications based on the one or more electronic communications being created by the user-defined communication creators.

33. The computer program product of claim 30, wherein the third set of codes is further configured to cause the computer to determine that two or more electronic communications received by separate electronic communication sources are priority communications based on occurrence of one or more of the user-defined key words in the two or more of the electronic communications.

34. The computer program product of claim 30, wherein the third set of codes is further configured to cause the computer to determine that two or more electronic communications are priority communications based on predetermined occurrence patterns of the user-defined key words in the electronic communications received by the plurality of electronic communication sources.

35. The computer program product of claim 29, wherein the fifth set of codes is further configured to cause the computer to communicate the notice as an electronic communication alert that notifies the user of the priority communications.

36. The computer program product of claim 35, wherein the fifth set of codes is further configured to cause the computer to communicate, via one or more user-designated electronic communication sources, the electronic communication alert.

37. The computer program product of claim 35, wherein the fifth set of codes is further configured to cause the computer to communicate, via an electronic communication source distinct from the plurality of electronic communication sources, the electronic communication alert.

38. The computer program product of claim 29, wherein the fifth set of codes is further configured to communicate the notice to a communication network-accessible portal.

39. The computer program product of claim 38, further comprising a sixth set of codes for causing a computer to present, in the network-accessible portal, the received electronic communications from the plurality of electronic communication sources.

40. The computer program product of claim 39, wherein the sixth set of codes is further configured to cause the computer to present, in the network-accessible portal, the received electronic communication in prioritized format based on the priority communications.

41. The computer program product of claim 39, wherein the sixth set of codes is further configured to cause the computer to present, in the network-accessible portal, business performance metrics associated with a business that employs the user.

* * * * *

UNITED STATES PATENT AND TRADEMARK OFFICE
CERTIFICATE OF CORRECTION

PATENT NO. : 8,751,596 B2  
APPLICATION NO. : 12/771552  
DATED : June 10, 2014  
INVENTOR(S) : Willard H. Waldron, III and Timothy James Mark It is certified that error appears in the above-identified patent and that said Letters Patent is hereby corrected as shown below:

In the Claims

Column 18, Claim 27, Line 54

The claim dependency of Claim 27 should read as --26--.

Please correct claim dependency of Claim 27 from [[20]] to --"26"-- to read as follows:

-- 27. The apparatus of claim 26, wherein the communications management portal application is further configured to present the received electronic communication in prioritized format based on the priority communications. --.

Signed and Sealed this
Twentieth Day of January, 2015

Michelle K. Lee
*Deputy Director of the United States Patent and Trademark Office*